(12) United States Patent
Hayami

(10) Patent No.: US 6,652,110 B2
(45) Date of Patent: Nov. 25, 2003

(54) VEHICLE LIGHTING APPARATUS

(75) Inventor: Toshihisa Hayami, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/138,271

(22) Filed: May 3, 2002

(65) Prior Publication Data

US 2002/0163794 A1 Nov. 7, 2002

(30) Foreign Application Priority Data

May 7, 2001 (JP) ...................................... P2001-135900

(51) Int. Cl.⁷ ................................................ B60Q 1/12
(52) U.S. Cl. ............................. 362/40; 362/37; 362/464
(58) Field of Search ............................. 362/37, 40, 464

(56) References Cited

U.S. PATENT DOCUMENTS

| | | | |
|---|---|---|---|
| 4,663,696 A | 5/1987 | Miyazawa et al. ............ 362/80 |
| 4,733,333 A | 3/1988 | Shibata et al. ................. 362/40 |
| 4,908,560 A | 3/1990 | Shibata et al. ............... 318/603 |

*Primary Examiner*—Sandra O'Shea
*Assistant Examiner*—Guiyoung Lee
(74) *Attorney, Agent, or Firm*—Fish & Richardson P.C.

(57) ABSTRACT

An adaptive front-lighting system includes lamp deflection angle controlling means having a steering angle sensor for detecting a steering direction of a vehicle and supplying a signal and controlling a deflection angle of a lamp based on sensor outputs from the steering angle sensor. The lamp deflection angle controlling means includes an arithmetic control means for calculating a time series moving average of the output from the steering angle sensor. Averaging the output from the steering angle sensor on the time axis in the arithmetic circuit means enables to obtain outputs having smaller step widths than step widths of the outputs from the steering angle sensor, and controlling the deflection angle of the lamp based on the output enables to control the deflection angle of the lamp with the minute step widths.

3 Claims, 12 Drawing Sheets

FIG. 11

EXAMPLES OF OUTPUT FROM THE STEERING ANGLE SENSOR AND CALCULATED VALUE OF TIME SERIES MOVING AVERAGE

| OUTPUT FROM STEERING ANGLE SENSOR | OUTPUT OF CALCULATED RESULT |
|---|---|
| 0 | 0.00 |
| 1 | 0.25 |
| 1 | 0.50 |
| 1 | 0.75 |
| 1 | 1.00 |
| 1 | 1.00 |
| 2 | 1.25 |
| 2 | 1.50 |
| 2 | 1.75 |
| 3 | 2.25 |
| 3 | 2.50 |
| 4 | 3.00 |
| 4 | 3.50 |
| 5 | 4.00 |
| 5 | 4.50 |
| 5 | 4.75 |
| 6 | 5.25 |
| 6 | 5.50 |
| 6 | 5.75 |
| 6 | 6.00 |
| 6 | 6.00 |
| 6 | 6.00 |

VEHICLE LIGHTING APPARATUS

BACKGROUND OF THE INVENTION

1. Field of the Invention

The present invention relates to a lighting apparatus for vehicles such as motor vehicles, and more specifically, to a vehicle lighting apparatus comprising lamp deflection angle controlling means for controlling the changes in direction of beam of the lamp corresponding to the traveling conditions, for example, an adaptive front-lighting system (hereinafter referred to as AFS) More specifically, the present invention relates to a vehicle lighting apparatus being capable of smooth control of the changes in direction of radiation.

2. Description of the Related Art

The AFS proposed for enhancing driving safety of motor vehicles detects information on the steering angle of the steering wheel SW of the motor vehicles, the vehicle speed, and other traveling conditions of the motor vehicles by the sensor 1, and the detected output is input to the electronic control unit 2 (hereinafter referred to as ECU) as shown in FIG. 1. The ECU 2 controls the swivel type lights 3R, 3L provided respectively on the left and right of the front portion of the motor vehicle, that is, the headlamps 3 that the direction of radiation can be deflected in the lateral direction based on the supplied sensor outputs. Such swivel type lights 3R, 3L may include, as a structure that can turn the reflector provided in the headlamp in the horizontal direction, a structure that can turn the reflector by the driving source such as a motor or the like. A mechanism for this turning is referred to as an actuator in this specification. According to the AFS in this type, by detecting the steering angle of the steering wheel or the lighting condition of the turn signal lamps while the vehicle is traveling on the curved road, and controlling the deflection of the direction of radiation of the swivel type light, the portion of the road ahead of the curve can be illuminated corresponding to the traveling speed of the motor vehicle, thereby being effective in improvement of driving safety.

In this AFS, the actuator is controlled to receive a signal from the steering sensor of the steering wheel and move the swivel type light by a required deflection angle based on the signal. Normally, step signals representing segments of angles obtained by dividing steering angle of the steering wheel are fed as the sensor outputs from the steering angle sensor of the steering wheel as shown in the upper graph in FIG. 12, and the deflection angle of the swivel type light is controlled to be changed step by step along with steering of the steering wheel as shown in the lower graph in the same figure. Therefore, the luminous intensity distribution characteristic of the swivel type lamp changes step by step, and thus the driver may have a sense of discomfort, and problems in traffic safety may arise. In order to solve these problems, the resolutions of the steering angle sensor and the actuator must simply be increased to reduce the widths of steps, and thus efforts has been made to improve the resolution of the actuator in various ways. However, since the resolution of the steering angle sensor is actually lower than the resolution of the actuator, the resolution of the entire AFS is tuned to the resolution of the steering angle sensor, and thus improvement of the resolution of the steering angle sensor is desired. However, it appears to be a reality that it is difficult to manufacture it in compact at a low cost. In this connection, in the actuator, the deflection angle of the swivel lamp 30 can be controlled step by step by 0.02°–0.03°, but in the steering angle sensor, the step signal is supplied approximately by 1° of the steering wheel. Therefore, based on the step-oriented sensor outputs of the steering angle sensor, the actuator must control to the luminous intensity distribution characteristic of the swivel lamp by controlling the deflection angle step by step approximately by 0.3°.

As is described above, in the conventional AFS, it is difficult to avoid the step-by-step control of the luminous intensity distribution characteristic of the swivel type lamp. In this case, when the steering wheel is turned to a large extend and thus the amount of change in outputs from the steering angle sensor is large, the swivel type light follows this change and is deflected at a high speed, so that the deflection angle is controlled smoothly in appearance even when it is controlled step by step, thereby realizing relatively smooth control of the luminous intensity distribution characteristic of the swivel type light. However, when the steering wheel is turned to a small extent and thus the amount of change in sensor outputs from the steering angle sensor is small, the deflecting angle of the swivel type light is controlled at a low speed step by step. Therefore, it is apparent that the deflection angle of the swivel type light is controlled step by step in appearance, and thus the luminous intensity distribution characteristic of the swivel type light is not smooth, which makes the aforementioned problem that the driver may have a feeling of discomfort distinctive.

SUMMARY OF THE INVENTION

The object of the present invention is to provide a vehicle lighting apparatus in which a smooth control of the change in luminous intensity distribution characteristic of the swivel type light is realized even when the existing steering angle sensor for supplying the sensor outputs with large step widths is used.

According to the present invention, there is provided a vehicle lighting apparatus comprising lamp deflection angle controlling means including a steering angle sensor for detecting the steering direction of the vehicle and supplying the signal varying step by step and controlling the changes in deflecting angle of the lamp based on the outputs from the steering angle sensor, characterized in that the lamp deflection angle controlling means comprises arithmetic circuit means for calculating the time series moving average of the outputs from the steering angle sensor, and controls the changes in deflection angle of the lamp based on the outputs of the arithmetic circuit means. The arithmetic circuit means is preferably adapted to decrease the amount of data on the sensor outputs to be used for calculating the time series moving average when the amount of change in sensor outputs from the steering angle sensor is large in comparison with the case in which the amount of change is small. The arithmetic circuit means is preferably adapted not to calculate the time series moving average when the amount of change in the steering angle sensor is at a certain level or higher.

According to the present invention, the outputs having smaller step widths in comparison with the step widths of the sensor outputs from the steering angle sensor can be obtained by averaging the sensor outputs from the steering angle sensor on the time axis in the arithmetic circuit means, and the changes in deflecting angle of the lamp can be controlled by minute step widths by controlling the changes in deflection angle of the lamp based on these outputs. Even when the existing steering angle sensor supplying the sensor outputs with large step widths is used, the deflection angle of the lamp can be controlled by minute step widths, and thus smooth control of luminous intensity distribution characteristic of the swivel type light can be realized.

BRIEF DESCRIPTION OF THE DRAWINGS

FIG. 11 is a drawing showing the sensor output from the steering angle sensor over against the outputs obtained by calculating the time series moving average.

DETAILED DESCRIPTION OF THE PREFERRED EMBODIMENTS

Figure 1:
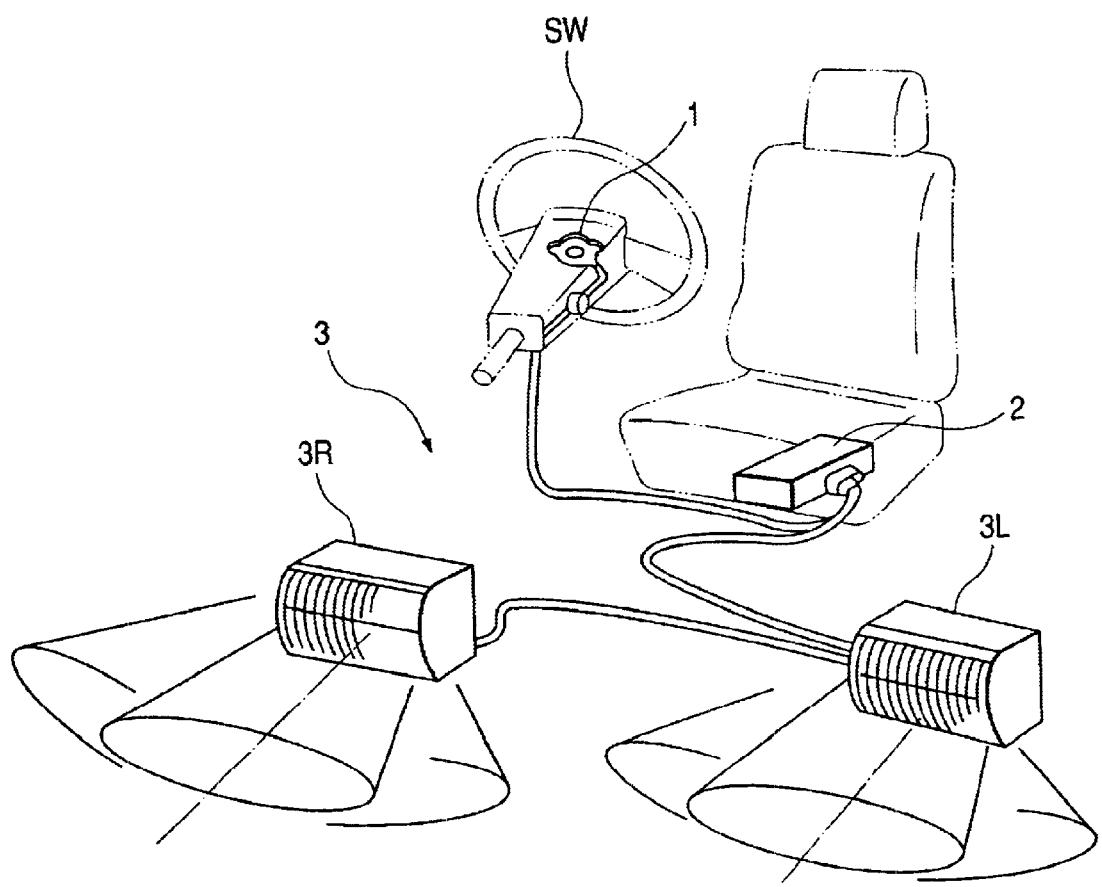
FIG. 1 is a drawing showing the conceptual construction of the AFS.
Figure 2:
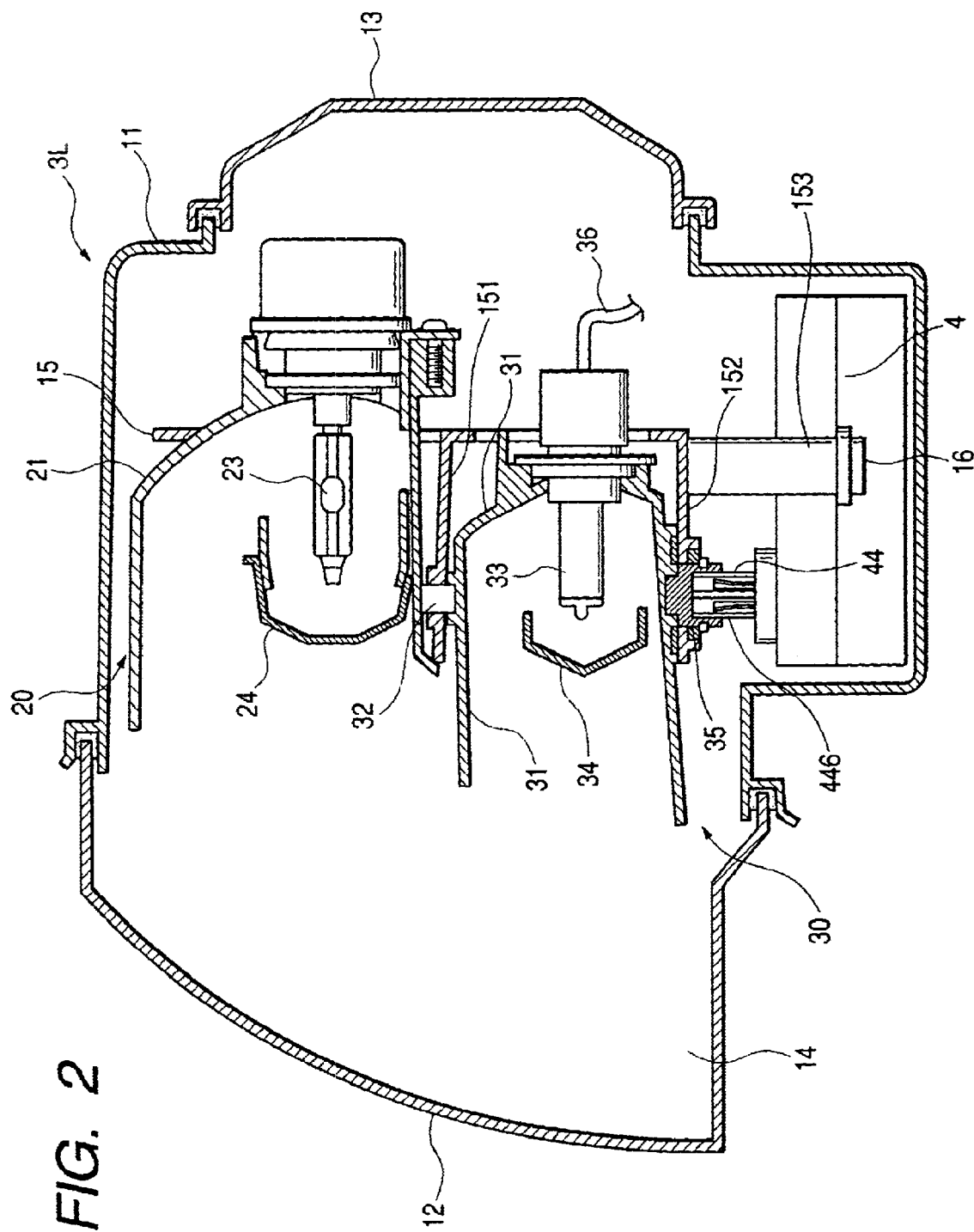
FIG. 2 is a vertical cross section of the swivel lamp.
Figure 3:
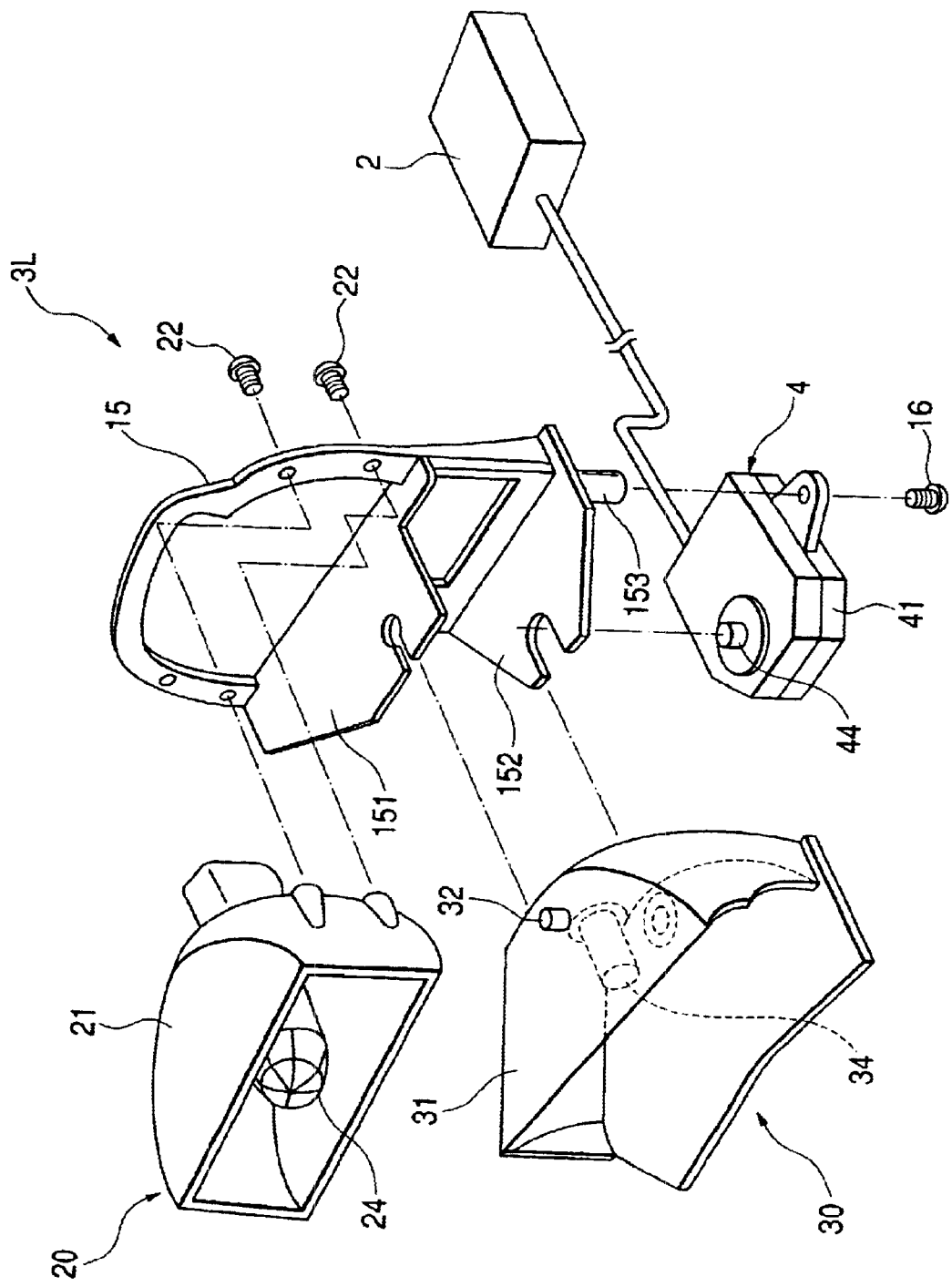
FIG. 3 is an exploded perspective view of the internal construction of the swivel lamp.

Referring now to the drawings, an embodiment of the present invention will be described. FIG. 2 is a vertical cross section of the left lamp 3L of the headlamps constructed of swivel type lights of which the direction of radiation is deflectable toward the left and the right out of the components of the AFS as lamp deflection angle controlling means according to the present invention shown in FIG. 1, FIG. 3 is a partially exploded perspective view of the internal construction thereof. The lamp body 11 is provided with a lens 12 at the front opening thereof and a cover 13 at the rear opening thereof to define a lamp chamber 14, and the lamp chamber 14 is provided with a fixed bracket 15 in the shape of a shelf having an upper plate 151 and the lower plate 152 therein. The fixed bracket 15 is provided with a fixed reflector 21 mounted at the upper portion thereof, and a swivel reflector 31 supported at the lower portion thereof. The fixed reflector 21 is fixed on the upper plate 151 of the fixed bracket 15 by means of a screw 22, and a discharge bulb 23 is mounted in the fixed reflector 21 together with a shade 24, so as to be constructed as a fixed lamp 20 (main lamp) having a prescribed luminous intensity distribution characteristic toward the front of the motor vehicle. The swivel reflector 31 is interposed between the upper plate 151 and the lower plate 152 of the fixed bracket 15, and fitted and supported so as to be capable of rotating in the horizontal direction about a supporting shaft 32 projected from the upper surface of the swivel reflector 31, and is provided therein with a halogen bulb 33 mounted together with a shade 34. An actuator 4 driven by the ECU 2 shown in FIG. 1 is fixed and supported on the lower side of the lower plate 152 of the fixed bracket 15 in the lamp chamber 14, and a stem 153 provided on the fixed bracket 15 is fixed on a part of the actuator 4 by means of a screw 16. The revolving output shaft 44 of the actuator 4 is connected to the bearing portion 35 provided on the lower surface of the swivel reflector 31 at the coaxial position with the supporting shaft 32, so that the swivel reflector 31 is driven and rotated by a rotational driving force of the revolving output shaft 44, and constructs a swivel lamp 30 (auxiliary lamp) of which the direction of radiation can be deflected toward the left and the right.

Figure 4:
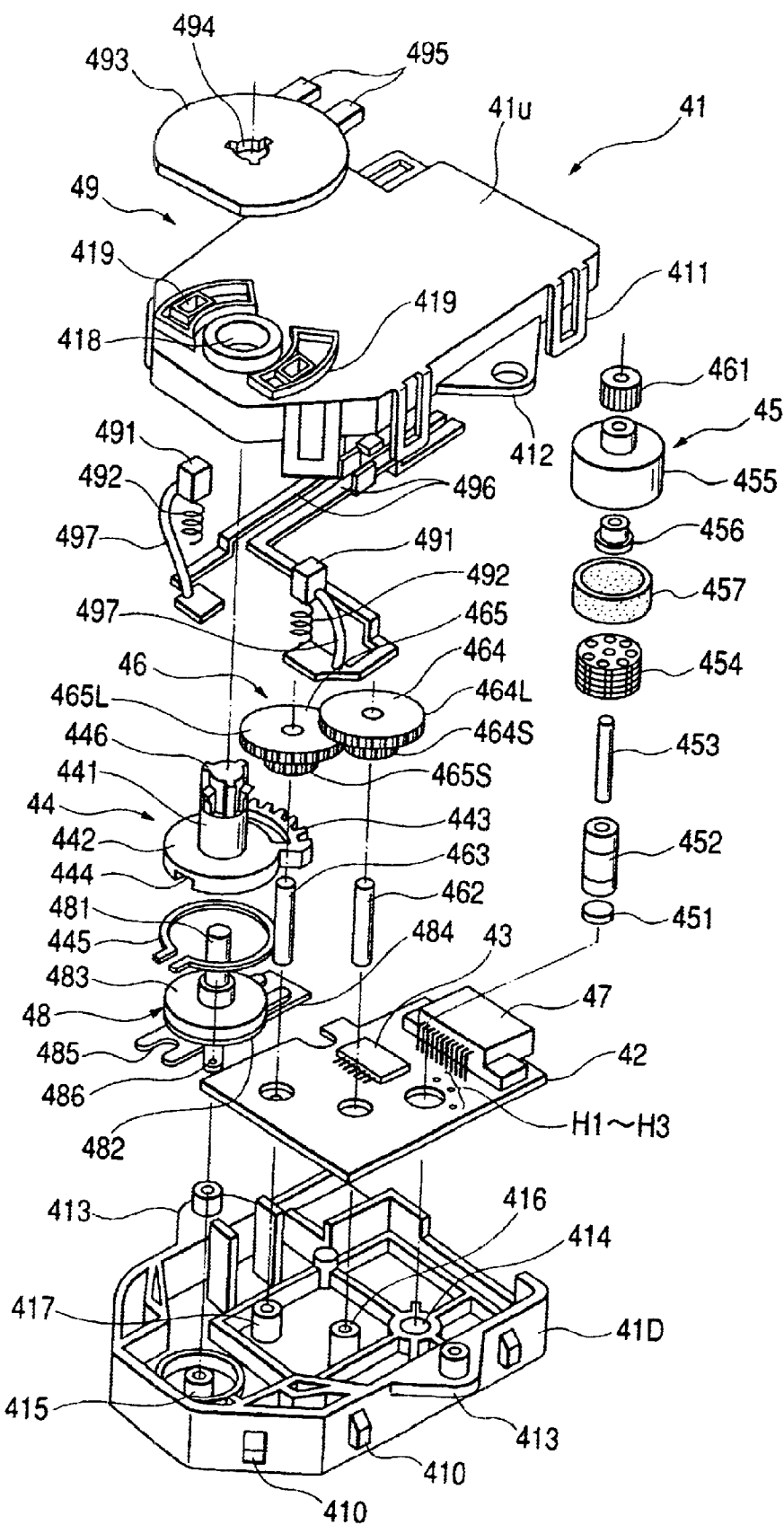
FIG. 4 is a partial exploded perspective view of the actuator.
Figure 5:
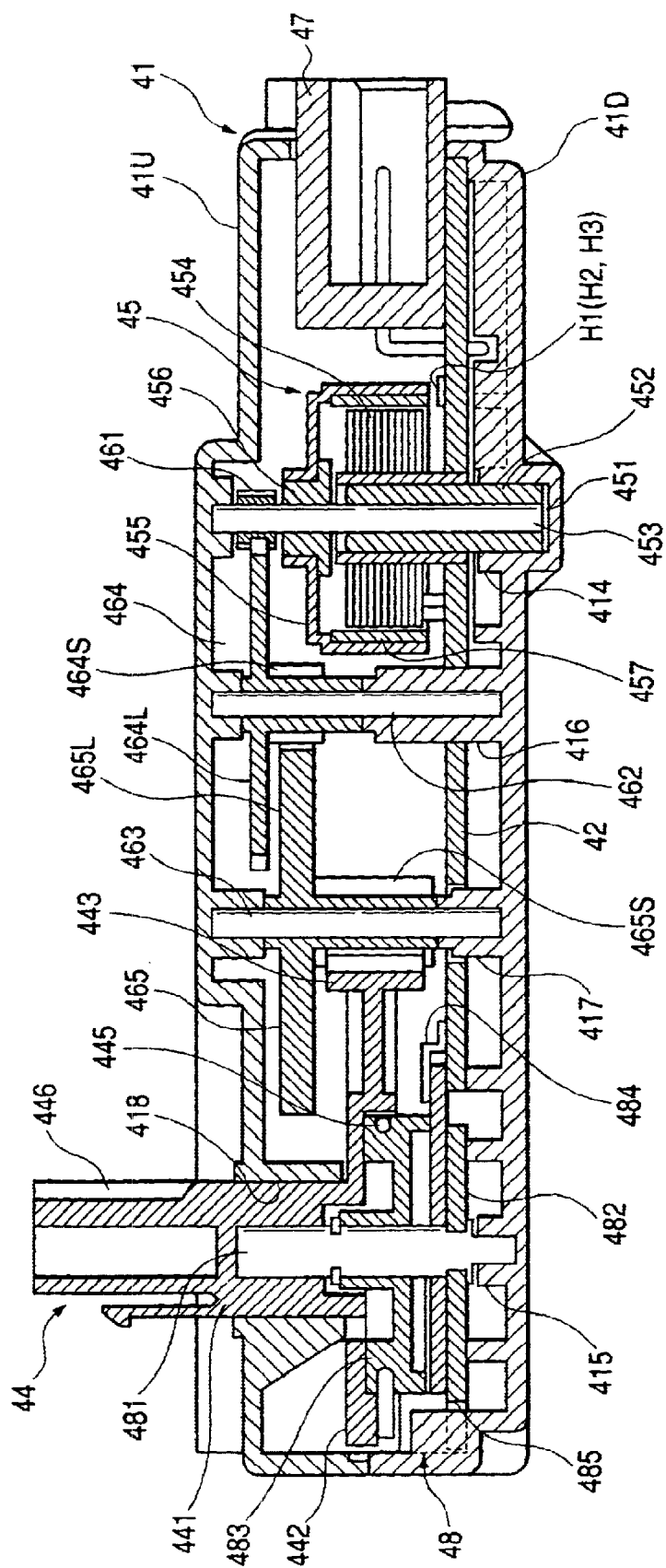
FIG. 5 is a vertical cross section of the actuator.

FIG. 4 is an exploded perspective view of the principal portion of the actuator 4, and FIG. 5 is a vertical cross section in its assembled state. The case 41 comprises a lower half 41D and the upper half 41U, and the projection 410 on the lower half 41D and the fitting strip 411 of the upper half 41U are fitted with respect each other. The upper half 41U and the lower half 41D are formed with the supporting strips 412, 413 projecting therefrom for supporting the fixed bracket 15 toward both sides respectively. The case 41 contains a printed board 42 having an electronic part 43 as a control circuit that will be described later, the revolving output shaft 44 for directly rotating the swivel reflector 31, a brushless motor 45 as a driving source for rotating the revolving output shaft 44, and a speed reducing gear mechanism 46 for transmitting a rotational force of the brushless motor 45 to the revolving output shaft 44 mounted thereon. The revolving output shaft 44 is provided with a potentiometer 48 as lamp deflecting angle detecting means disposed coaxially therewith. The printed board 42 is provided with a connector 47 to which the vehicle-mounted power cable, not shown, is connected for supplying electric power to the brushless motor 45 and the halogen lamp 33 of the swivel lamp 30 respectively. The upper half 41U is provided with a movable contact mechanism 49 for electrically connecting the actuator 4 and the cable 36 of the halogen lamp 33 on the upper surface thereof.

Figure 6:
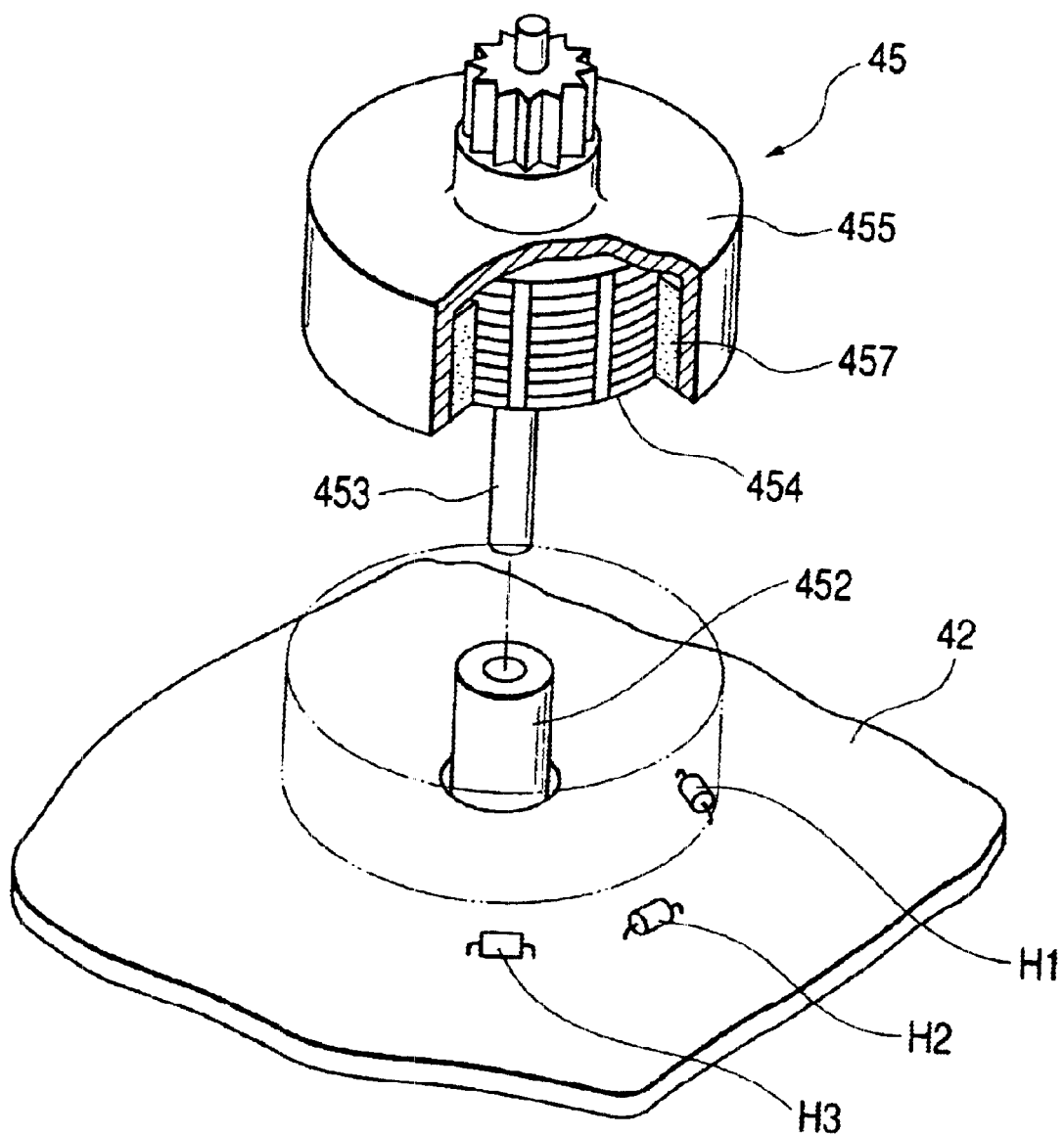
FIG. 6 is a partially enlarged perspective view of a brushless motor.

The brushless motor 45 comprises, as shown in FIG. 6 as a partially broken perspective view, a revolving shaft 453 supported in the boss hole 414 of the lower half 41D by means of a thrust bearing 451 and the bearing sleeve 452 so as to be capable of torsional rotation, a stator coil 454 fixed and supported on the printed board 42 around the revolving shaft 453, and a rotor 455 formed in the shape of a cylindrical container fixed to the revolving shaft 453 and mounted so as to cover the stator coil 454. The rotor 455 is fixed to the revolving shaft 453 by the rotor boss 456, and provided with a cylindrical rotor magnet 457 integrally on the inner surface thereof. The stator coil 454 comprises three pairs of coils equally distributed in the circumferential direction, and each pair of coils is fed with power via the printed wiring of the printed board 42, not shown, and magnetized into S-pole and N-pole alternately in the circumferential direction by such power feeding. The rotor magnet 457 is magnetized into S-pole and N-pole alternately in the circumferential direction corresponding to the stator coil 454. In the brushless motor 45, by supplying alternate current having different phases, that is, three phase current with respect to three coils of the stator coil 454, the rotor magnet 457, that is, the rotor 455 and the revolving shaft 453 are driven to rotate. In addition, as shown in FIG. 6, a plurality of, in this case, three hall elements H1, H2, H3 are disposed and supported on the printed board 42 at required intervals along the circumferential direction of the rotor 455, so that the magnetic field in each hall element H1, H2, H3 is changed when the rotor magnet 457 is rotated along with the rotor 455, and the state of each hall elements H1, H2, H3 is changed between ON and OFF to supply pulse signal corresponding to the cycle of rotation of the rotor 455.

The potentiometer 48 is provided with a fixed substrate 482 fixed on the fixed shaft 481 passing through the printed board 42 and standing upright in the boss hole 415 of the lower half 41D, and having a resistance pattern, not shown, formed on the surface thereof, and a rotary disc 483 rotatably supported on the fixed shaft 481 so as to face toward the fixed substrate 482 in the axial direction, and having a sliding contact point, not shown, for sliding on the surface of the resistance pattern. The fixed substrate 482 is prevented from rotating with respect to the lower half 41D by engaging the engaging projection 485 provided on a part of the circumference with a part of the inner wall of the lower half 41D. The rotary disc 483 is formed with an adjusting strip 486 projected from a part of the circumference thereof. This potentiometer 48 is constructed in such a manner that a rotary motion of the rotary disc 483 varies the sliding position of the sliding contact point on the surface of the resistance pattern, which in turn varies the resistance value of the resistance pattern provided on the fixed substrate 482, and the resistance value is supplied from the electrode terminal 484 on the fixed substrate 482 as the rotational position of the revolving output shaft, or as the deflection angle detected signal of the swivel reflector 31.

The revolving output shaft 44 is adapted to be connected with the rotary disc 483 of the potentiometer 48 via a clutch, and comprises a hollow shaft 441 covered on the fixed shaft 481 of the potentiometer 48 so as to be capable of torsional rotation, a clutch cylinder 442 in the shape of a short cylinder integrally provided at the lower end portion of the hollow shaft 441, and a sector gear 443 formed integrally along a part of the outer periphery of the clutch cylinder 442. The clutch cylinder 442 is disposed so as to cover the rotary disc 483 and provided at a part of the circumference thereof with a notch 444. A clutch spring 445 formed by bending the spring wire material into a substantially circular shape and being resiliently attached on the peripheral surface of the rotary disc is engaged with the notch 444 at both ends, whereby the clutch cylinder 442 is connected to the rotary disc 483 via the clutch spring 445 so as to be frictional in the direction of rotation. Therefore, by rotating the revolving output shaft 44, or the clutch cylinder 442, by manual operation in a state in which rotation of the rotary disc 483 is locked by holding the adjusting strip 486 projected from a part of the circumference of the rotary disc 483 with a jig or the like, relative position between the potentiometer 48 and the revolving output shaft 44 in the direction of rotation can be adjusted by rotating the revolving output shaft 44 in a sliding motion with respect to the rotary disc 483 by the frictional connection of the clutch spring 445. The relative position adjustment is utilized for zero adjustment of the output from the potentiometer 48.

The speed reducing gear mechanism 46 is provide in the region between the brushless motor 45 and the sector gear 443 of the potentiometer 48. The speed reducing gear mechanism 46 comprises a drive gear 461 mounted on the revolving shaft 453 of the brushless motor 45 and a first gear 464 and a second gear 465 rotatably supported respectively on two fixed shafts 462, 463 passing through the printed board 42 and standing upright at a required interval in the boss holes 416, 417 of the lower half 41D. The first gear 464 and the second gear 465 comprises integrally formed larger gears 464L, 465L and smaller gears 464S, 465S respectively. The drive gear 461 engages the larger gear 464L of the first gear 464, and the smaller gear 464S of the first gear 464 engages the larger gear 465L of the second gear 465, and then the smaller gear 465S of the second gear 465 engages the sector gear 443. Accordingly, a rotational force of the brushless motor 45 is reduced by the speed reducing gear mechanism 46 and transmitted to the sector gear 443, so that the revolving output shaft 44 is rotated at a reduced speed.

The upper end portion of the revolving output shaft 44 is formed as a spline shaft 446 and passed through the output shaft hole 418 formed on the upper half 41U and projected from the upper surface of the case 41, so as to be fitted in the spline groove on the bearing portion 35 provided on the lower surface of the swivel reflector 31 to allow the swivel reflector 31 to rotate integrally by a rotational force of the revolving output shaft 44.

The movable contact point mechanism 49 disposed on the upper surface of the upper half 41U comprises a pair of contact point brushes 491 contained in the case 41, partially exposed part of them through a pair of rectangular holes 419 formed on the upper surface on a circumference and urged into the projecting direction by the springs 492, and a contact plate 493 having a spline shaft hole 494 for fitting the spline shaft 446 of the revolving output shaft 44 therein so as to be rotated integrally with the revolving output shaft 44 in the direction of rotation in the region above the contact point brushes 491. The contact point plate 493 is provided on the lower surface thereof with a pair of contact point strips (not shown) extending therefrom for sliding contact with the contact point brushes 491, so as to be capable of rotating together with the revolving output shaft 44 in a state in which the electrical contact with the contact point brushes 491 is maintained. The contact point plate 493 is provided with an electrode terminal 495 continuing to the contact point strip, and the electrode terminal 495 may be attached and detached with a connector, not shown, of the cable 36 connected to the halogen lamp 33 of the swivel lamp 30 shown in FIG. 2. The pair of contact point brushes 491 are connected to the ends of a pair of narrow conductive plates 496 extending respectively in the case 41 via the conductive wires 497, which in turn is electrically connected to the vehicle mounted power source, not shown, by a connector, not shown, to be connected to the other ends of the conductive plates 495. Accordingly, the movable contact point mechanism 49 electrically connects the halogen lamp 33 with the vehicle-mounted power source, and prevents the cable 36 for connecting the swivel lamp 30 and the actuator 4 from becoming kinked when the swivel reflector 31 of the swivel lamp 30 is moved, thereby ensuring smooth rotational movement of the swivel reflector 31.

Figure 7:
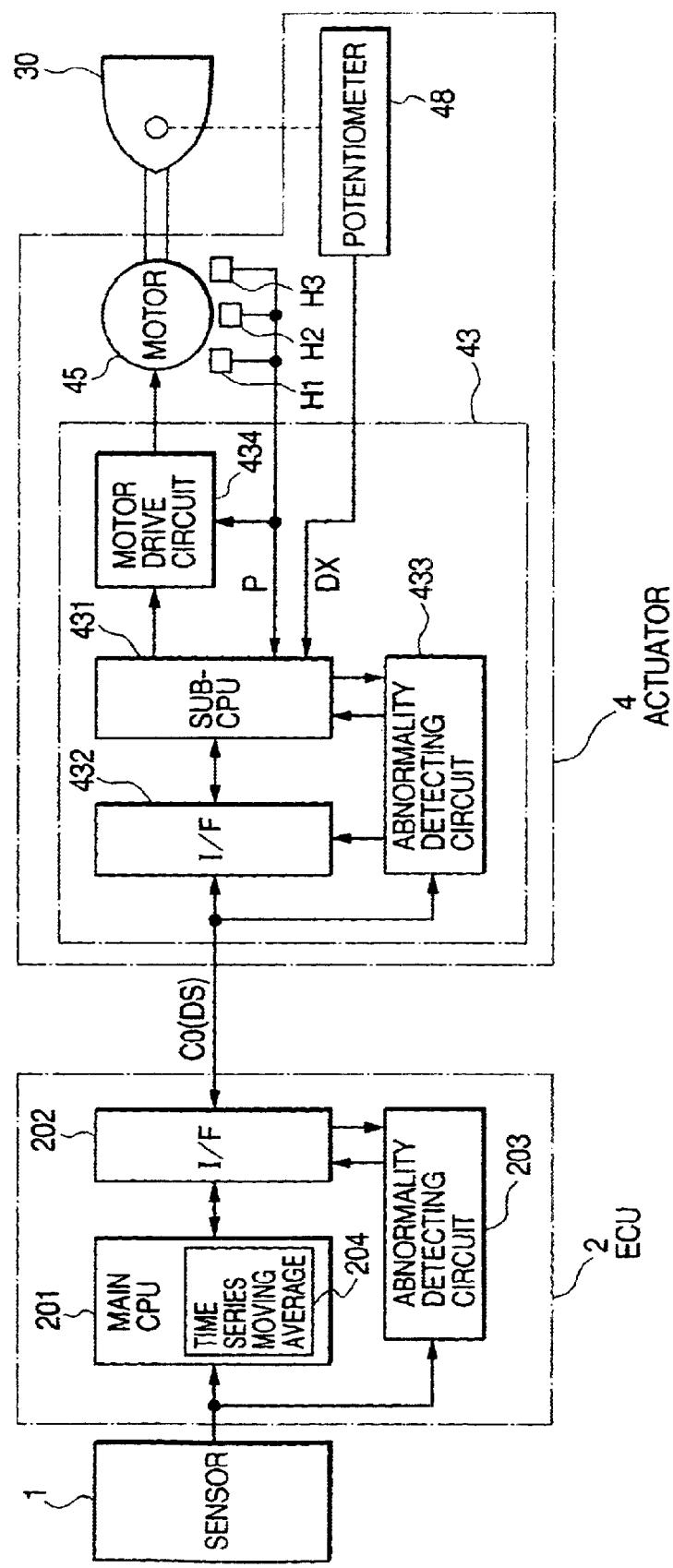
FIG. 7 is a block circuit diagram showing a circuit construction of the AFS.

FIG. 7 is a block circuit diagram showing the construction of the electric circuit of the ECU 2 and the actuator 4. The actuator 4 is mounted on the left and right swivel lamps 3L, 3R of the motor vehicle respectively, and being able to intercommunicate with the EUC 2. The ECU 2 contains a main CPU 201 for processing by a prescribed algorithm based on information from the aforementioned sensor 1 to output the required control signal CO, an interface circuit 202 for feeding and receiving the control signal CO between the main CPU 201 and the actuator 4 (hereinafter referred to as I/F), an abnormality detecting circuit 203 for observing the various signals in the ECU 2 including the main CPU 201 and supplying the abnormality-detected signal when abnormality is detected. As regards the sensor 1, the outputs from the steering angle sensor for detecting the steering angle of the steering wheel SW are to be input to the ECU 2. In addition, a time series moving average circuit 204 for calculating the time series moving average of the stepped outputs corresponding to the steering angle of the steering wheel SW from the steering angle sensor 1 is provided in the main CPU 201, and the sensor output averaged in the time series moving average circuit 204 is supplied to the actuator 4 in the form of a deflection angle signal DS as a part of the control signal CO.

The controlling circuit 43 comprising electronic components contained in the actuators 4 provided respectively in the swivel lamps 30 provided in the left and right swivel type lights 3L, 3R of the motor vehicle comprises an I/F circuit 432 for feeding and receiving the signal to and from the ECU 2, a sub-CPU 431 for processing by a prescribed algorithm based on the signal entered form the I/F circuit 432, pulse signal P fed from the hall elements H1, H2, H3, and the deflection angle detected signal DX entered from the potentiometer 48, an abnormality detecting circuit 433 for observing signals supplied through the I/F circuit 432 and supplying an abnormality-detected signal to the sub-CPU 431 when such signals are determined to be abnormal, and a motor drive circuit 434 for driving and rotating the brushless motor 45. Here, from the ECU2, the deflection angle signal DS is supplied to the actuator 4.

Figure 8:
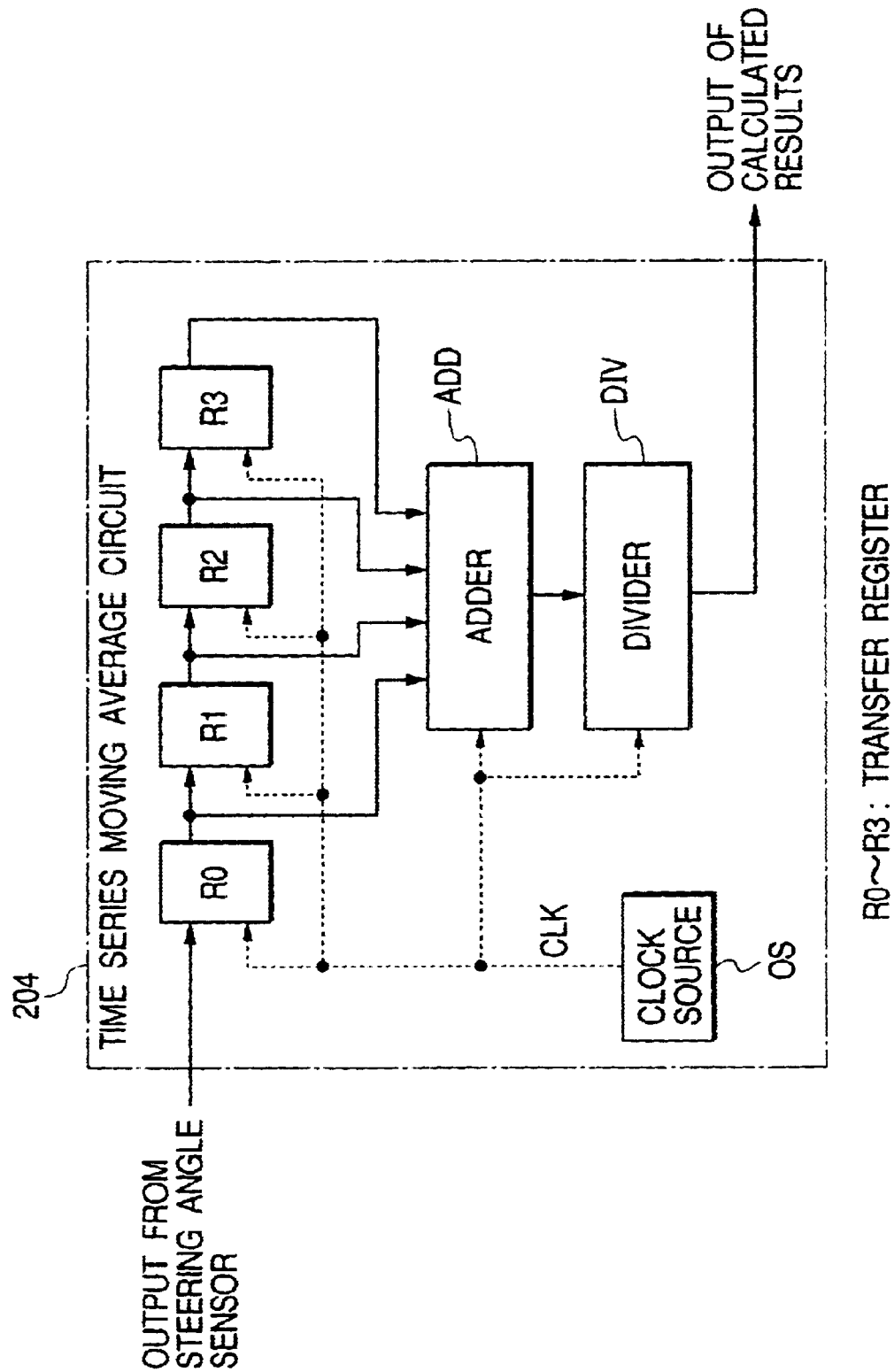
FIG. 8 is a circuit diagram showing an example of the time series moving average circuit.

FIG. 8 is a block circuit diagram showing an example of the time series moving average circuits 204. In this example, four transfer registers R0–R3 to be supplied with the sensor outputs from the steering angle sensor 1 are cascaded, and each transfer register R0–R3 is adapted to be synchronized with the clock signal CLK from the clock source OS and transfer the sensor outputs sequentially. Each transfer register R0–R3 is connected to the adder ADD in which each of the supplied sensor outputs is added in synchronization with the clock signals CLK, and the adder ADD is connected to the divider DIV in which the added value is divided by 4 to calculate the average, and then the output from the divider DIV is supplied as angle information of the steering angle. With this time series moving average circuit 204, the sensor outputs from the steering angle sensor 1 is stored sequentially in the transfer registers R0–R3 in synchronization with the clock signals CLK and transferred in order, and simultaneously, the sensor outputs from the respective transfer registers R0–R3 are added in the adder ADD, and the added value is divided by 4 in the divider DIV and then supplied. Therefore, the time series moving average circuit 204 supplies the average values of the sensor outputs that moves over time at the timing in synchronization with the clock signals CLK. In this connection, the output S of the time series moving average circuit 204 is:

$$S=(S_n+S_{n-1}+S_{n-2}+S_{n-3})\div 4$$

where: $S_n$ is the current output from the steering angle sensor, $S_{n-1}$ is the last output from the steering angle sensor obtained the last time, $S_{n-2}$ is the last but one output from the steering angle sensor, $S_{n-3}$ is the last but two output from the steering angle sensor.

Figure 9:
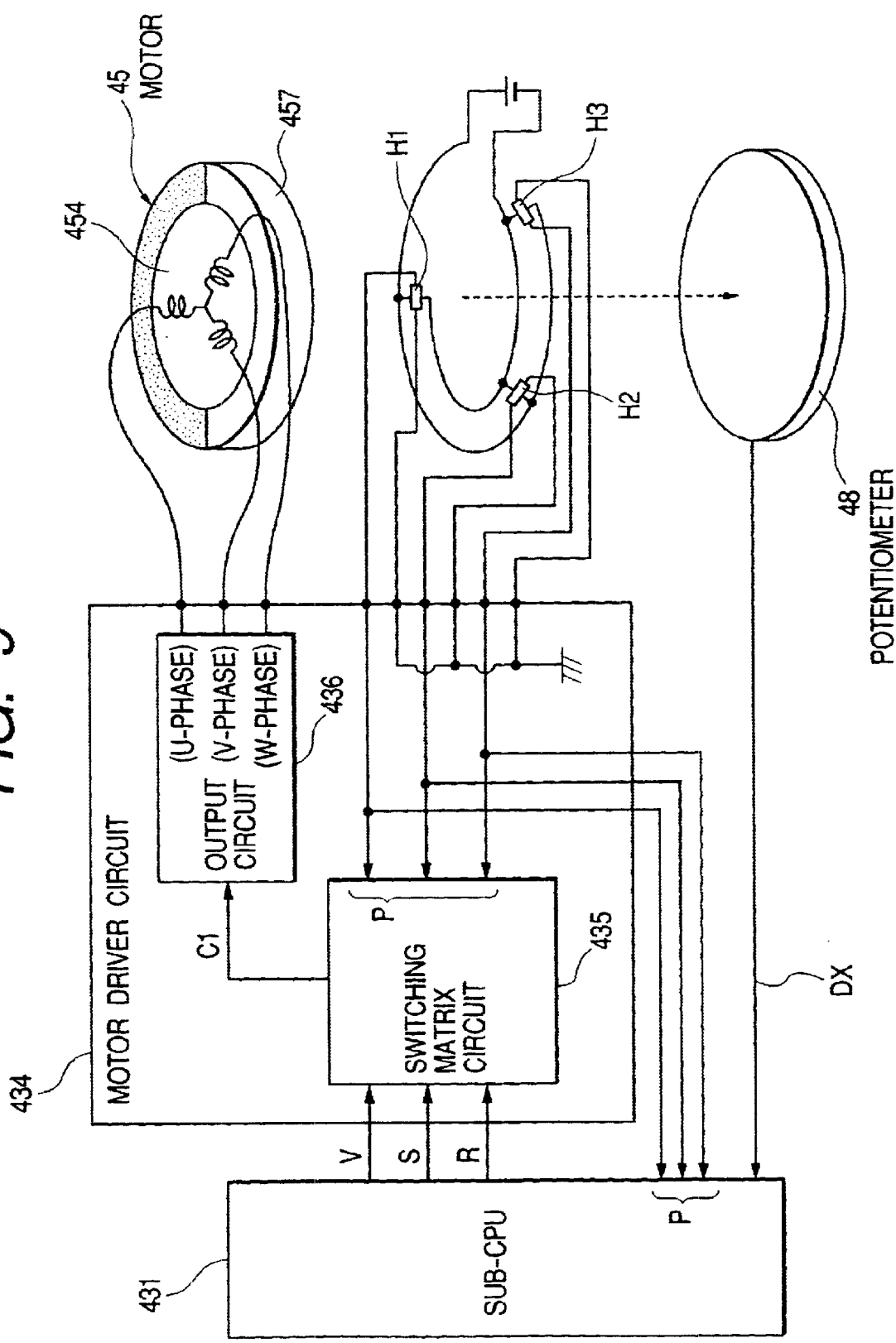
FIG. 9 is a circuit diagram showing a circuit construction of the actuator.

FIG. 9 is a circuit diagram showing a frame format of the motor drive circuit 434 and the brushless motor of the actuator 4. A switching matrix circuit 435 for receiving speed control signal V, start/stop signal S, normal/reverse rotation signal R respectively from the sub-CPU of the actuator 4 as control signal, and pulse signal from the three hall elements H1, H2, H3, and an output circuit 436 for adjusting the phase of electric power in three phases (U phase, V phase, and W phase) to be supplied to three pairs of coils in the stator coil 454 of the brushless motor 45 upon receipt of the output from the switching matrix circuit 435. In this motor drive circuit 434, supplying each electric power of U phase, V phase, and W phase to the stator coil 454 rotates the magnet rotor 457, and thus the rotor 455 and the revolving shaft 453 integrated therewith rotate. When the magnet rotor 457 rotates, each hall element H1, H2, H3 detects variations in magnetic field, and then supplies pulse signal P. The pulse signal P is entered into the switching matrix circuit 435, and the switching operation in the output circuit 436 is performed in exact timing with the pulse signal supplied into the switching matrix circuit 435, so that the rotation of the magnet rotor 457 continues. The switching matrix circuit 435 supplies a required control signal Cl to the output circuit 436 base on speed control signal V, start/stop signal S, and normal/reverse rotation signal R from the sub-CPU 431. The output circuit 436, upon receipt of the control signal C1, adjusts the phase of electric power in three phases to be supplied to the stator coil 454 to control the start and stop of the rotational motion, the direction of rotation, and speed of rotation of the brushless motor 45. The output from the potentiometer 48 provided in the actuator 4 is entered into the sub-CPU 431. The sub-CPU 431 receives a part of the pulse signal P supplied from each hall element H1, H2, H3, and recognizes the rotating state of the brushless motor 45.

According to the construction described above, as shown in FIG. 1, when information on the steering angle of the steering wheel SW of the motor vehicle, the speed of the motor vehicle, and other traveling state of the motor vehicle is supplied from the sensor 1 disposed in the motor vehicle into the ECU 2, the ECU 2 performs calculation in the main CPU 201 based on the supplied sensor outputs, calculates the deflection angle signal of the swivel lamp 30 of the swivel type lights 3L, 3R in the motor vehicle, and enters it into the respective actuators 4 of the swivel type lights 3L, 3R. Then, in the actuator 4, the sub-CPU 431 performs calculation based on the supplied deflection angle signal, calculates the signal corresponding to the deflection angle signal and supplies to the motor drive circuit 434, and drives and rotates the brushless motor 45. Since the rotational drive force of the brushless motor 45 is decelerated in the speed reducing gear mechanism 46 and transmitted to the revolving output shaft 44, the swivel reflector 31 connected to the revolving output shaft 44 rotates in the horizontal direction, and the direction of the optical axis of the swivel lamp 30 is varied. When the swivel reflector 31 makes a rotary motion, the rotary disc 483 of the potentiometer 48 is rotated with the rotation of the revolving output shaft 44, and thus the rotating angle of the revolving output shaft 44, or the deflecting angle of the swivel reflector 31 is detected based on variations in resistance value when the sliding contact point is slid on the surface of the resistance pattern on the fixed substrate 482 by a rotary motion of the rotary disc 483, and the deflection angle detected signal DX is entered into the sub-CPU 431. The sub-CPU 431 then compares the deflection angle detected signal DX with the deflection angle signal DS supplied form the ECU 2, and performs feedback control on the rotating angle of the brushless motor 45 to make them coincide with each other, so that the direction of the optical axis of the swivel reflector 31, or the direction of the optical axis of the swivel lamp 30 can be controlled to the angular position set by the deflection angle signal DS with high degree of accuracy.

With such deflecting motion of the swivel reflector 31, in both of the swivel type lights 3L, 3R, light directed in the straight ahead direction of the motor vehicle emitted from the fixed lamp 20 and deflected light emitted from the swivel lamp 30 are joined to illuminate the area including the left and right areas deflected from the straight ahead direction of the motor vehicle, so that not only the straight ahead direction of the motor vehicle, but also the front area in the steered directions can be illuminated during travel of the motor vehicle, thereby enabling enhancement of driving safety.

The abnormality detecting circuits 203, 433 detect the abnormality in AFS respectively and supply the abnormality-detected signal. The main CPU 201 and the sub CPU 431, upon receipt of the abnormality-detected signal, release the swivel lamp 30 from the aforementioned deflected state and force the optical axis of the swivel lamp 30 to be set to a prescribed reference position of deflection so that the traffic safety problem in that the optical axis of the swivel lamp 30 stays in the deflected state and cannot be adjusted due to abnormality of the AFS can be solved, which will not be described here.

Figure 10:
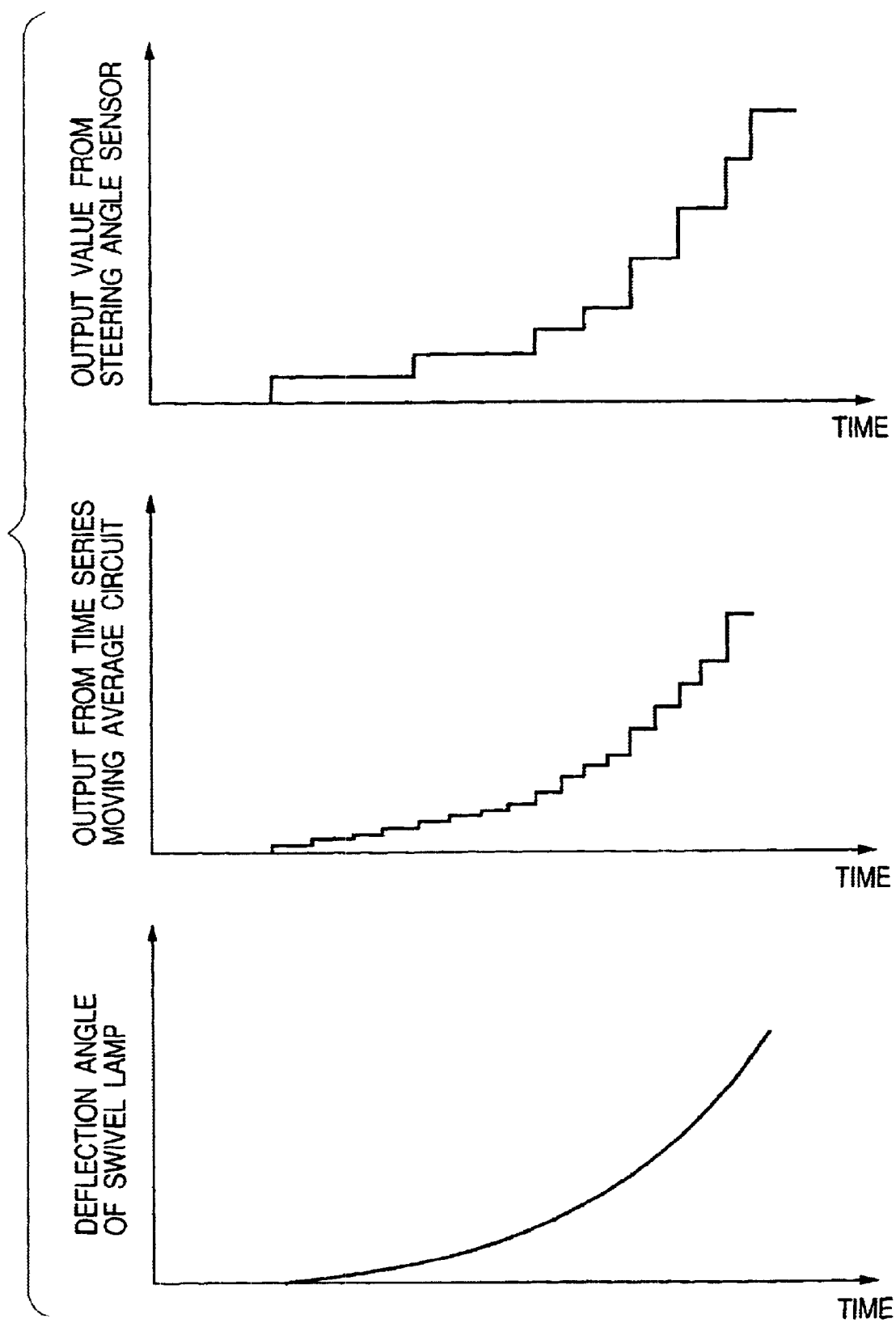
FIG. 10 is a drawing showing a sensor output from a steering angle sensor in comparison with a deflection angle of a swivel type light according to an embodiment.
Figure 12:
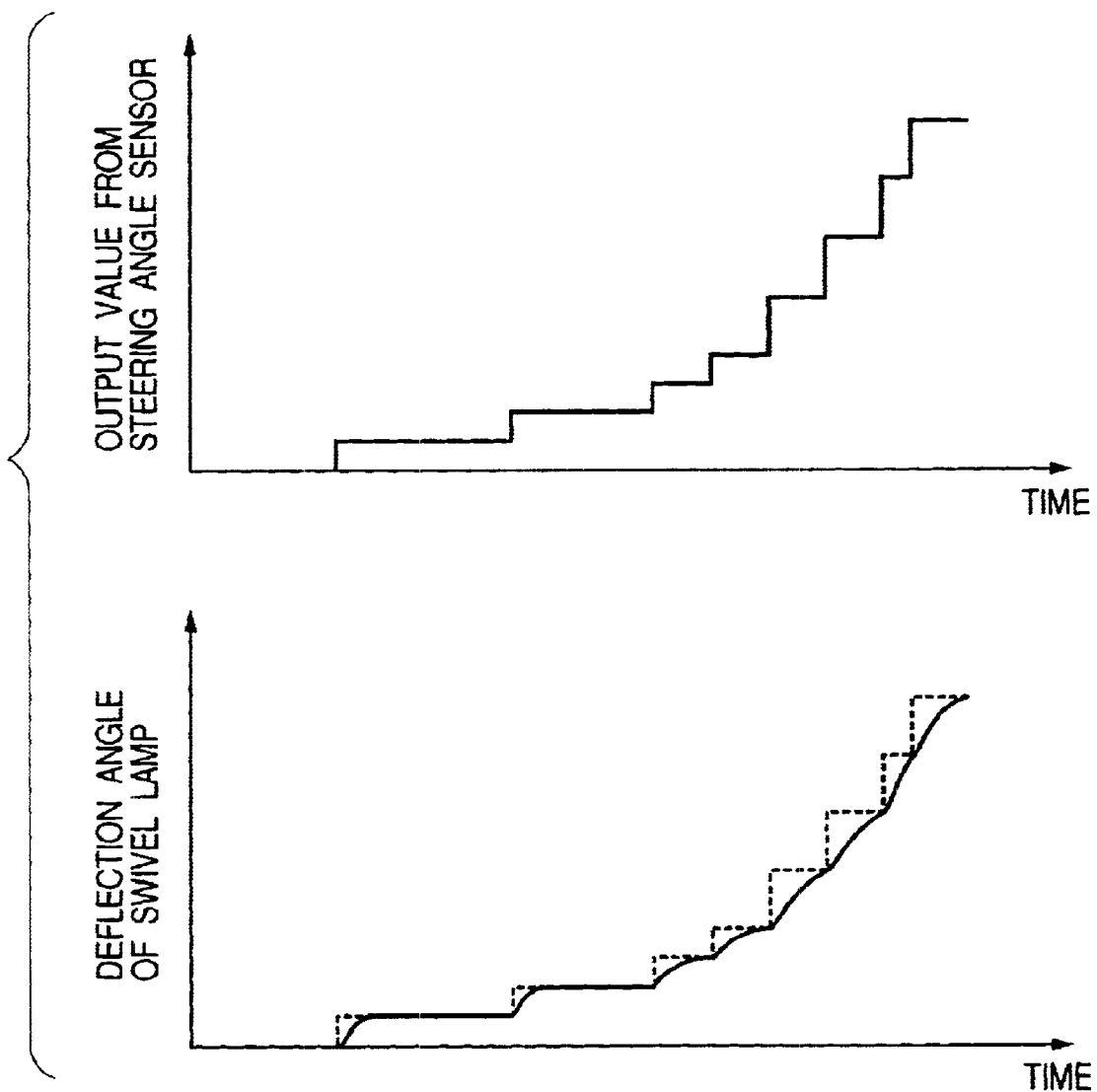
FIG. 12 is a drawing showing a sensor output from a steering angle sensor in an AFS according to the related art over against the deflection angle of the swivel type light.

On the other hand, as described above, when output data from the steering angle sensor 1 obtained by sensing the steering condition of the steering wheel SW is supplied to the main CPU 201, the time series moving average circuit 204 outputs the value of time series moving average of the sensor outputs calculated at the timing of the clock signals CLK. For example, the upper graph in FIG. 10 shows the output from the same steering angle sensor 1 as the one shown in FIG. 12, in which the steering angle sensor 1 outputs data step by step by 1° of the steering wheel. On the other hand, the actuator can control the deflection angle of the swivel lamp 30 step by step with the step widths of 0.02°–0.03°. The average of output data from the steering angle sensor 1 is calculated here in the time series moving average circuit 204, assuming that the cycle of the clock signal CLK is 6 ms. FIG. 11 shows the values of the sensor outputs supplied from the steering angle sensor over against the average output from the time series moving average circuit 204, which shows that the outputs from the time series moving average circuit 204 can be obtained as output data with minute step widths even when the values of output data, in which the amount of change in sensor outputs from the steering angle sensor 1 is small, are "1" or "2" by calculating the time series moving average. In the case where the values of output data, in which the amount of change in sensor outputs from the steering angle sensor 1 is relatively large, are "3" to "5" as well, output data with further minute step widths can be obtained.

Therefore, output data being equivalent with those obtained from the sensor outputs from the steering angle sensor 1 with improved resolution may be obtained by the time series moving average circuit 204, and as shown in the middle in FIG. 10, the output (calculated output) with smaller step widths with respect to the stepped sensor output from the steering angle sensor 1 can be obtained. While the step of the steering angle sensor is 1°, the step widths of the output obtained in this example is 0.25°, which is one-fourth thereof. The main CPU 201 generates a deflection angle signal DS based on the output with reduced step width 3 and supplies it to the actuator 4, and then the actuator 4 controls the deflection angle of the swivel lamp 30 based on the deflection angle signal DS, so that the deflection angle of the swivel lamp 30 can be controlled by the step widths of 0.08°, which is about one-fourth of the conventional case, utilizing the aforementioned resolution of the actuator effectively as shown in the lowermost graph in FIG. 10. Accordingly, the luminance intensity distribution characteristic of the swivel lamp 30 can be changed smoothly, thereby preventing the driver from having a sense of discomfort about illumination, and the AFS from increasing in price.

Now, in the time series moving average circuit 204, since the time series moving average is calculated based on a constant clock signal, when the amount of change in output data from the steering sensor 1 is large, the amount of data from the sensor outputs for calculating the time series moving average with respect to the amount of change is smaller in comparison with the case when the amount of change is smaller. However, when the amount of change in sensor outputs is large, the effect of the steps on the deflection angle control of the swivel lamp 30 is small as described above, and thus smooth control of the luminance intensity distributing characteristic is not impaired. Since the effect of steps on the deflection angle control of the swivel lamp can almost be ignored when the amount of change in the sensor outputs from the steering angle sensor 1 is not less than a predetermined constant value, the averaging process in the time series moving average circuit may be omitted in this case. In this case, it must only be constructed in such a manner that the difference between the current data and the previous data in the circuit in FIG. 8, for example, is calculated, and when the difference is not less than the constant value, the current data is supplied as it is, whereby the deflection control with high response can be achieved while eliminating the time required for calculation.

The construction of the time series moving average circuit is not limited to the circuit construction in the embodiment described above, and for example, it may be constructed in such a manner that output data from the steering angle sensor is sequentially stored in the memory such as RAM, and stored output data is sequentially read for making calculation as addition and division. Alternatively, it may be constructed in such a manner that the sensor outputs from the steering angle sensor are sequentially sampled on the time series and the sampled data is added and divided to obtain the average.

Though an example of the AFS using the headlamp comprising the fixed lamp and the swivel lamp integrated with each other is shown as a swivel type light in the aforementioned embodiment, such construction that the swivel lamp, being formed as a single independent light, is used as an auxiliary lamp and combined with the headlamp comprising a fixed lamp to construct a swivel type light is also employed.

As is described above, according to the present invention, in an AFS for controlling the deflection angle of the lamp based on the sensor outputs from the deflection angle sensor, providing the lamp deflection angle controlling means comprises an arithmetic circuit means for calculating the time series moving average of the output from the steering angle sensor and averaging the output from the steering angle sensor on the time axis in the arithmetic circuit means enables to obtain outputs having smaller step widths than the step widths of the output from the steering angle sensor, thereby enabling control of the changes in deflection angle of the lamp with the minute step widths. Accordingly, even when the existing steering angle sensor with larger step widths is used, control of the deflection angle of the lamp with minute step widths is realized, thereby realizing smooth control of the changes in luminance intensity distribution characteristic of the swivel type light.

What is claimed is:

1. A vehicle lighting apparatus comprising:
 a steering angle sensor for detecting a steering direction of a vehicle and supplying a signal varying stepwise; and
 lamp deflection angle controlling means for controlling a deflecting angle of a lamp based on outputs from said steering angle sensor, said lamp deflection angle controlling means including arithmetic circuit means for calculating a time series moving average of the outputs from said steering angle sensor,
 wherein the control of the deflection angle is based on outputs from said arithmetic circuit means.

2. The vehicle lighting apparatus according to claim 1, wherein said arithmetic circuit means decreases an amount of data of the outputs from said steering angle sensor to be used for calculating the time series moving average when an amount of change in the outputs from said steering angle sensor is large in comparison with a case in which an amount of the change is small.

3. The vehicle lighting apparatus according to claim 2, wherein said arithmetic circuit means does not calculate the time series moving average when the amount of the change in said steering angle sensor is at a certain level or higher.

* * * * *